Patented Nov. 14, 1922.

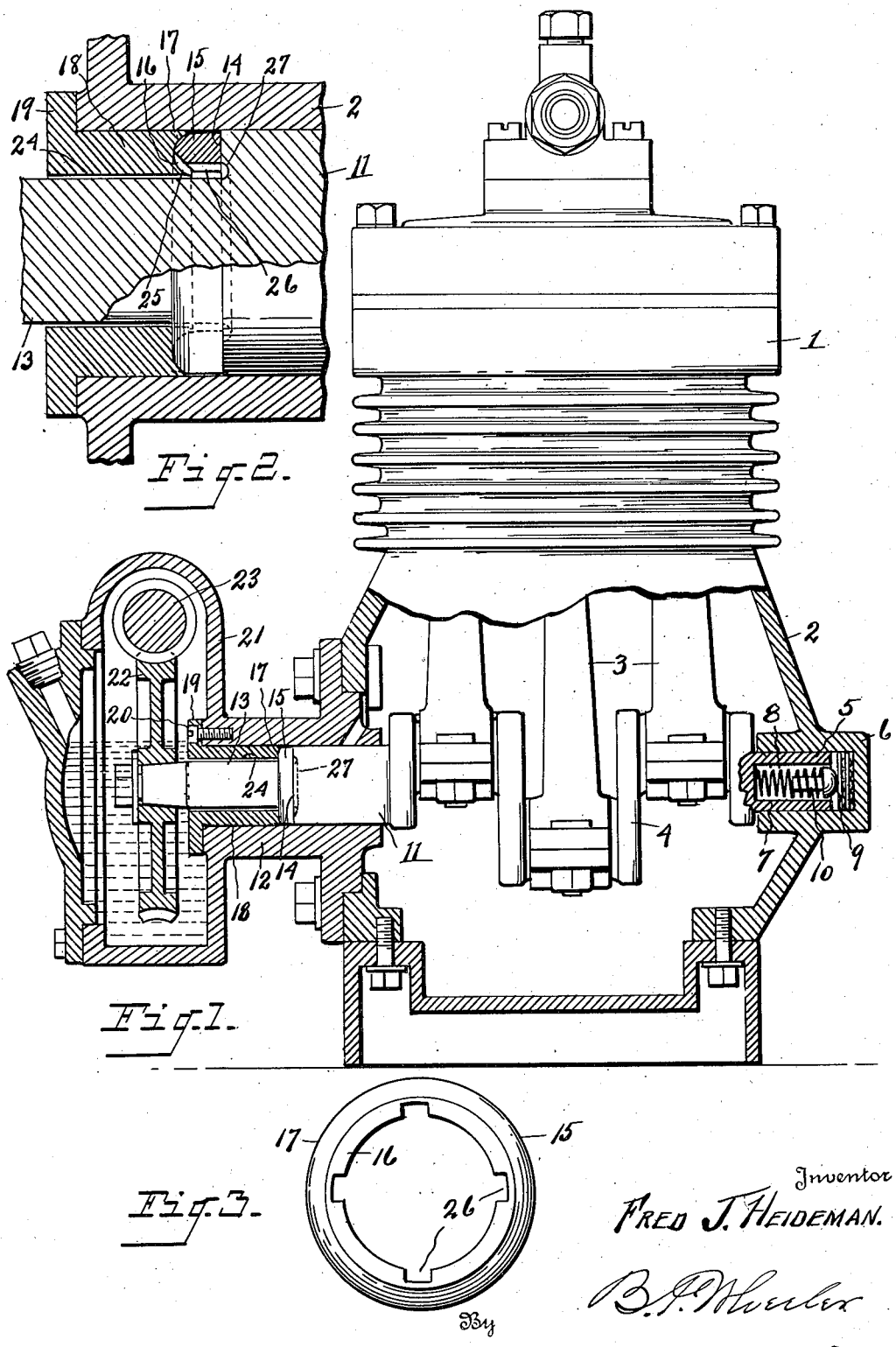

1,435,391

UNITED STATES PATENT OFFICE.

FRED J. HEIDEMAN, OF DETROIT, MICHIGAN, ASSIGNOR, BY DIRECT AND MESNE ASSIGNMENTS, TO HOUSEHOLD UTILITIES CORPORATION, OF DETROIT, MICHIGAN, A CORPORATION OF DELAWARE.

JOURNAL-BEARING SEAL.

Application filed October 13, 1919. Serial No. 330,414.

*To all whom it may concern:*

Be it known that I, FRED J. HEIDEMAN, a citizen of the United States, residing at Detroit, in the county of Wayne and State of Michigan, have invented a new and useful Journal-Bearing Seal, of which the following is a specification.

This invention relates to journal bearing seals, and has a particular application to a refrigerating unit for preventing the gaseous refrigerant from escaping between the crank-shaft journal of the compressor for said refrigerant and the bearing for said journal.

It is the object of the invention to provide a seal to prevent leakage of a fluid between a journal and its bearing, particularly when the bearing is in a wall confining a fluid under pressure, as is the case in a refrigerating unit in which the crank-case of a compressor for the gaseous refrigerant forms a chamber for said refrigerant.

In attaining said object the invention contemplates providing a sealing ring upon a reduced portion of a shaft within a journal bearing for the same, a bushing engaging one side of said ring within said bearing, and a spring acting upon the shaft to force a shoulder thereon firmly against the other face of said ring.

A preferred embodiment of the invention is hereinafter described, and is illustrated in the accompanying drawing, wherein,—

Fig. 1 is a view in side elevation and partial section of a refrigerating unit to which the invention is applied.

Fig. 2 is an enlarged sectional view of the journal bearing seal as applied to said unit.

Fig. 3 is a detail view of the sealing ring.

In these views the reference character 1 designates the cylinder casing of a compressor 2, the crank-case of the same, 3 the connecting rods or pitmen and 4 the crank-shaft. At one end said shaft is provided with the journal 5 engaging a closed bearing 6 in said crank-case, said journal having the socket 7 therein receiving a coiled spring 8 tending to thrust the crank-shaft away from said bearing. Said spring acts upon the bearing 6 through a semi-spherical head 9 which has a stem 10 extending within the spring, and which minimizes the friction resulting from the pressure of the spring upon said bearing.

Adjacent its other end said shaft is provided with a journal 11 engaging an open bearing 12 in the crank-case. Beyond said journal said shaft is of a reduced diameter, as indicated at 13, a square shoulder 14 thus being formed. Said shoulder bears against the flat inner face of a sealing ring 15, preferably formed of steel, embracing the reduced portion 13 of the shaft, the opposite face of said ring having a beveled inner portion 16 and an arcuate outer portion 17. The arcuate surface of said ring engages the concaved inner end of a bushing 18 which is tightly fitted into the outer portion of the bearing 12 and is flanged at 19 to bear upon the outer end of said bearing. Screws 20, or other suitable fastenings, may engage said flange with the bearing to maintain the bearing rigid. The reduced portion 13 of the crank-shaft passes through the bushing 18, with a slight clearance from the latter, and projects into a gear chamber 21, which may be formed integral with the bearing 12. Within said chamber a worm-wheel 22 is mounted fast upon said reduced portion and is driven by a worm 23. To minimize the friction arising between said worm and worm-wheel, the chamber 21 is partially filled with a suitable lubricating oil. This oil has access to the bearing faces of the sealing ring 15, passing through the clearance space 24 between the shaft 13 and bushing 18 to the outer face of said ring, to which face it is distributed through the annular passage 25 formed between the beveled face 16 of the ring and the opposed concaved face of the bushing. From the annular space 25, the lubricant reaches the inner face of the sealing ring through a series of slots 26 formed interiorly in the ring 15, an annular distributing groove 27 being formed in the shoulder 14 opposite said slots. The pressure exerted upon the shaft 4 by the spring 8 causes the sealing ring to be engaged firmly between the bushing 18 and shoulder 14. The engaging faces of the sealing ring, bushing, and shoulder are ground to fit and consequently quite positively prevent any passage of gas, particularly in view of the lubrication of said surfaces.

Lubricant is supplied from the chamber 21 through the clearance space 24 to the ring 15, being distributed to the arcuate bearing face 17 of said ring through the annular chamber 25 and to the plane inner bearing face of the ring by way of the passages 26 and the annular channel 27 of the shaft. The ring is free both with respect to the bearing 12 and the shaft journaled therein, and may either turn with the shaft or remain stationary according to the relative frictional resistances exerted by the shaft and the bushing 18. Because of the arcuate engaging faces of said ring and bushing, the ring will be free to participate with the shaft in any such slight angular movements thereof as may result from the stresses to which the shaft is subjected in actuating the pitmen 3, without giving rise to any clearance between the ring and bushing such as might result in a leakage of gas.

What I claim is:—

1. In a journal bearing seal, the combination with a bearing and a shaft journaled therein, having an annular shoulder within said bearing, of a bushing rigidly engaging in said bearing at one side of said shoulder, and spaced from said shaft to form a lubricant passage, and a sealing ring, free with respect to said bearing and shaft and engaged between said shoulder and bushing, the opposed faces of said ring and corresponding faces of the bushing and shoulder being respectively plane and arcuate, and a lubricant passage being formed in the ring between said faces, in communication with the first-mentioned lubricant passage, and means exerting an axial thrust upon the shaft to maintain the ring under pressure between the bushing and said shoulder.

2. In a journal bearing seal, the combination with a bearing and a shaft journaled therein having an annular shoulder within said bearing, of a bushing rigidly engaging in said bearing at one side of said shoulder and spaced from said shaft to form a lubricant passage, and a sealing ring, free with respect to said bushing and shaft and engaged between said shoulder and bushing, the opposed faces of said ring and corresponding faces of the bushing and shoulder being respectively plane and arcuate, and annular lubricant distributing chambers being formed at each side of the ring, and being connected by a passage through the ring.

3. In a journal bearing seal, the combination with a crank shaft and crank casing, the former having journals adjacent its ends and the latter having a closed bearing engaging one of said journals and an open bearing engaging the other, of a spring acting within the closed bearing, thrusting the shaft toward the open bearing, said shaft having a shoulder within said open bearing, a bushing rigidly engaging the open bearing, a sealing ring free with respect to said bearing and shaft and engaged between said shoulder and bushing, the ring being maintained under pressure between said bushing and shoulder by the thrust exerted by said spring upon said shaft, and a semispherical head engaging said closed bearing and receiving the thrust of said spring, said head having a stem extending within the spring.

In testimony whereof I sign this specification.

FRED J. HEIDEMAN.